(12) United States Patent
Li

(10) Patent No.: US 6,726,137 B1
(45) Date of Patent: Apr. 27, 2004

(54) SPINCAST FISHING REEL HAVING NOVEL DRAG MECHANISM

(75) Inventor: Chi Shing Li, Hong Kong (HK)

(73) Assignee: Shakespeare Company, Columbia, SC (US)

( * ) Notice: Subject to any disclaimer, the term of this patent is extended or adjusted under 35 U.S.C. 154(b) by 146 days.

(21) Appl. No.: 10/050,681

(22) Filed: Jan. 16, 2002

(51) Int. Cl.[7] .............................................. A01K 89/01
(52) U.S. Cl. ...................................... 242/238; 242/246
(58) Field of Search ................................ 242/246, 234, 242/236, 238, 239, 240

(56) References Cited

U.S. PATENT DOCUMENTS

| | | | |
|---|---|---|---|
| 3,381,914 A | | 5/1968 | Taggart |
| 3,481,554 A | | 12/1969 | Hull |
| 3,488,015 A | | 1/1970 | Taggart |
| 3,682,411 A | | 8/1972 | Dumbauld |
| 3,703,262 A | * | 11/1972 | Menne ........................ 242/239 |
| 3,810,592 A | | 5/1974 | Host |
| 4,378,914 A | | 4/1983 | Shackelford et al. |
| 4,402,469 A | | 9/1983 | Stiner |
| 4,474,341 A | | 10/1984 | Shackelford et al. |
| 4,702,432 A | | 10/1987 | Kaneko et al. |
| 4,728,053 A | * | 3/1988 | Hitomi ........................ 242/246 |
| 4,776,526 A | | 10/1988 | Saito |
| 4,796,828 A | | 1/1989 | Councilman |
| 4,907,759 A | * | 3/1990 | Takeuchi et al. ............. 242/246 |
| 4,911,378 A | | 3/1990 | Hitomi |
| 5,098,032 A | | 3/1992 | Toda |
| 5,348,245 A | * | 9/1994 | Sugawara .................... 242/246 |
| 5,427,325 A | | 6/1995 | Weaver |
| 5,544,832 A | | 8/1996 | Okamoto |
| 5,564,640 A | * | 10/1996 | Egasaki et al. .............. 242/246 |
| 5,904,309 A | | 5/1999 | Takeuchi |
| 5,918,827 A | | 7/1999 | Pulliam |
| 5,947,400 A | | 9/1999 | Tsutsumi |
| 5,950,947 A | | 9/1999 | Kirby |
| 6,299,086 B1 | | 10/2001 | Li et al. |
| 6,375,107 B1 | * | 4/2002 | Wong ........................ 242/240 |

* cited by examiner

Primary Examiner—Emmanuel Marcelo
(74) Attorney, Agent, or Firm—Nelson Mullins Riley & Scarborough

(57) ABSTRACT

A spincast fishing reel has a reel frame to which front and rear covers are attached. The rear cover includes a pivotable thumb button which is depressed by a user when fishing line is to be cast. The front cover closes the face of the reel, but defines a forward opening through which the fishing line extends. A normally nonrotatable line spool is located inside of the front cover on a spool hub of the reel frame. Fishing line is wound onto the line spool by a rotatable pickup head located forward of the line spool. An improved drag arrangement includes a drag nut mounted on a threaded portion of the spool hub. A gear train arrangement is provided to operatively connect a suitable thumb wheel with the drag nut. Rotation of the thumb wheel by a user causes rotation 6f the drag nut, which varies the drag force imposed on the line spool.

36 Claims, 10 Drawing Sheets

SPINCAST FISHING REEL HAVING NOVEL DRAG MECHANISM

BACKGROUND OF THE INVENTION

The present invention relates to the art of fishing reels. More particularly, the invention relates to closed faced fishing reels commonly known as spincast reels.

Spincast fishing reels typically have a central body, or "reel frame," to which front and rear covers are attached. The reel frame includes a spool hub supporting a line spool on which the fishing line is wound. A pickup head, mounted forward of the spool, winds the line around the spool when rotated by a crank handle. The front cover is configured to surround and cover both the line spool and the pickup head. The line exits through a central opening at the forward end of the front cover.

The line spool is normally stationary, but will rotate if a certain tension is placed on the fishing line. Thus, line may be payed out if a hooked fish places undue tension on the fishing line. The tension threshold at which the fishing line will be payed out is set by the reell's drag mechanism.

Currently, many drag systems for spincast reels produce drag on the spool utilizing a screw driven by a thumb wheel. The screw pushes a steel washer against a drag washer that lies below the spool. The force exerted by the screw causes a friction force between the drag washer and the spool, thus resulting in "drag" on the spool. The friction force can be varied by tightening or loosening the screw, which is accomplished by turning the thumb wheel in a clockwise or counterclockwise direction. Because the force is applied at only one location on the washer, however, the drag may tend to feel rough when line is pulled from the spool.

SUMMARY OF THE INVENTION

The present invention recognizes and addresses the foregoing considerations, and others, of prior art constructions and methods.

According to one aspect, the present invention provides a fishing reel comprising a reel frame including a spool support hub. The spool support hub has a threaded portion on which a drag nut is located. A normally nonrotatable line spool defining a central cavity is mounted on the spool support hub. The fishing reel further includes a drag assembly received in the central cavity of the line spool and connected to the line spool so as to impose a drag force thereon. The drag nut operatively engages the drag assembly such that axial movement of the drag nut due to angular turning thereof will vary the drag force imposed on the line spool.

In some exemplary embodiments, the central cavity defines at least one axial keyway engaged by at least one tab of the drag assembly. For example, the central cavity may define first and second diametrically opposite keyways engaged by respective keys of the drag assembly.

Preferably, the drag assembly may include a plurality of discs which are arranged to increase the drag force upon compression thereof by the drag nut. In such embodiments, some of the discs may be nonrotatable discs while others are rotatatble discs. Moreover, at least one of the discs may be configured as a spring disc. In addition, the discs may preferably be located on the spool support hub between the drag nut and a suitable retaining element, such as a retaining nut. The retaining element may also be located inside the central cavity of the spool support hub.

It may often be desirable for the drag nut to include a first portion of greater outer diameter having gear teeth on at least an angular segment thereof. In such embodiments, a second portion of lesser outer diameter may be received in the central cavity of the line spool. Preferably, the line spool may be configured to define a first gear seat located about one end of the central cavity. The first gear seat provides clearance for the first portion of the drag nut as it axially moves.

In some embodiments, it will be desirable for gear teeth to be located about the entire periphery of the first portion of the drag nut. Preferably, a thumb wheel will be operatively connected to the drag nut such that rotation of the thumb wheel effects axial movement of the drag nut. A portion of the thumb wheel may extend through a slot defined in the reel frame.

In other aspects, the present invention provides a fishing reel comprising a reel frame including a spool support hub. A normally nonrotatable line spool defining a central cavity is mounted on the spool support hub. A pickup head, axially and rotatably movable with respect to the line spool, is also provided. A drag nut, defining gear teeth on at least an angular segment of an outer surface thereof, is located on the spool support hub.

The fishing reel further includes a drag assembly received in the central cavity of the line spool and connected thereto so as to impose a drag force thereon. A thumb wheel is operatively connected to the drag nut such that rotation of the thumb wheel effects axial movement of the drag nut and thereby varies the drag force imposed on the line spool. A closed-face cover is connected to the reel frame to enclose the line spool and the pickup head. The cover includes a forward opening therein through which fishing line extends.

Still further aspects of the present invention are provided by a fishing reel comprising a reel frame including a spool support hub. A normally nonrotatable line spool, defining a central cavity, is mounted on the spool support hub. A pickup head is axially and rotatably movable with respect to the line spool. A crank handle is operatively associated with the pickup head such that rotation of the crank handle causes rotation of the pickup head.

The fishing reel further includes a drag nut located on the spool support hub such that angular turning of the drag nut effects axial movement thereof. A drag assembly is received in the central cavity of and is connected to the line spool so as to impose a drag force thereon. The drag nut operatively engages the drag assembly such that axial movement of the drag nut due to angular turning thereof will vary the drag force imposed on the line spool. A manual actuator, such as a thumb wheel, may be provided to effect rotation of the drag nut.

A closed-face cover is connected to the reel frame to enclose the line spool and pickup head. The front cover includes a forward opening therein through which fishing line extends. A rear cover is also connected to the reel frame. The rear cover has a pivotable thumb button mounted thereon which is actuatable to allow casting of the fishing line.

The accompanying drawings, which are incorporated in and constitute a part of this specification, illustrate one or more embodiments of the invention and, together with the description, serve to explain the principles of the invention.

BRIEF DESCRIPTION OF THE DRAWINGS

A full and enabling disclosure of the present invention, including the best mode thereof to one of ordinary skill in the art, is set forth more particularly in the remainder of the specification, which makes reference to the accompanying drawings, in which.

Figure 1:
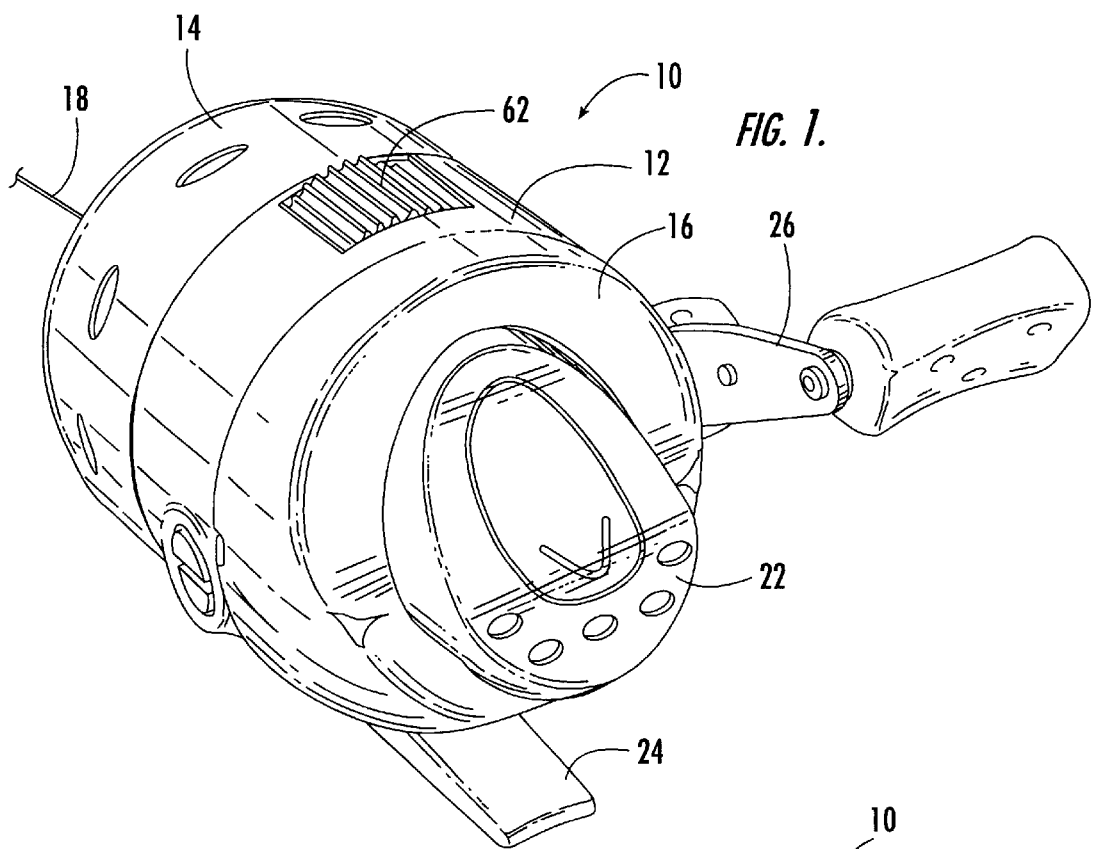
FIG. 1 is a rear perspective view of a spincast fishing reel constructed in accordance with the present invention.

Repeat use of reference characters in the present specification and drawings is intended to represent same or analogous features or elements of the invention.

DETAILED DESCRIPTION OF THE PREFERRED EMBODIMENTS

Reference will now be made in detail to presently preferred embodiments of the invention, one or more examples of which are illustrated in the accompanying drawings. Each example is provided by way of explanation of the invention, not limitation of the invention.

Figure 2:
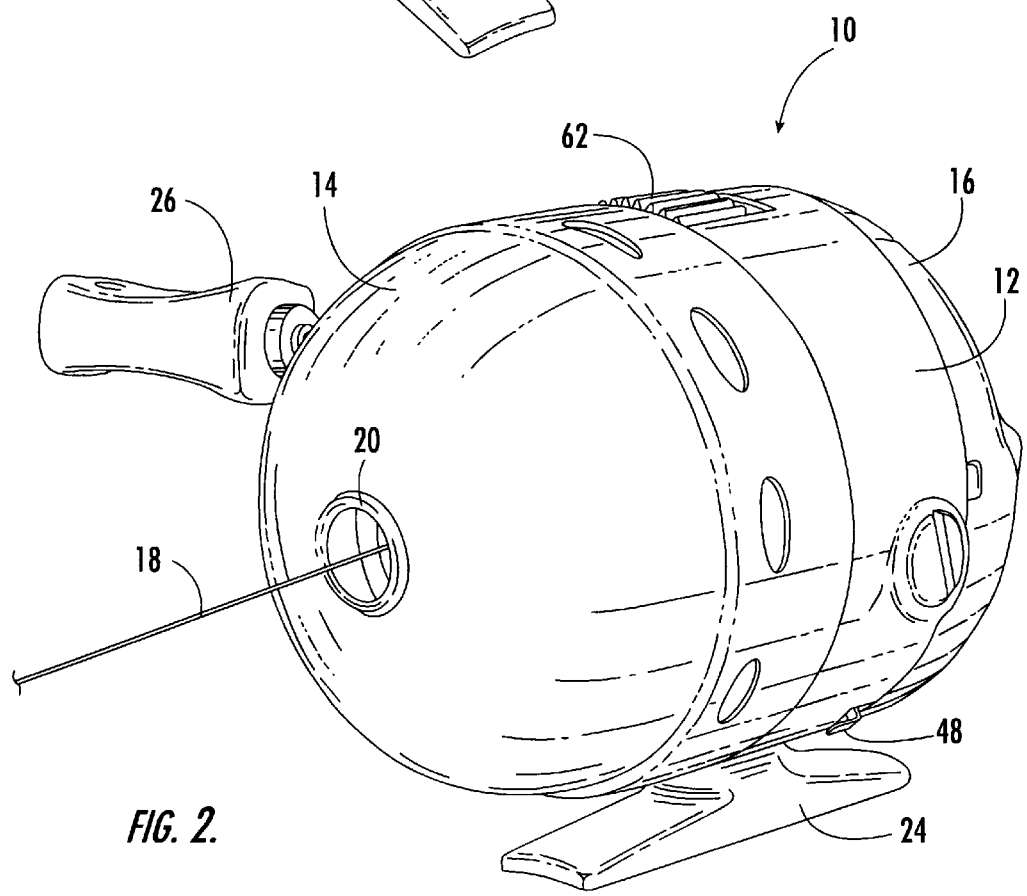
FIG. 2 is a front perspective view of the reel shown in FIG. 1.

FIGS. 1 and 2 illustrate an improved spincast reel 10 constructed in accordance with the present invention. Reel 10 includes a reel frame 12 to which a front cover 14 and a rear cover 16 are detachably connected. Fishing line 18 extends through a forward opening 20 defined in front cover 14. In addition, a pivotable thumb button 22 is carried by rear cover 16. A user depresses thumb button 22 to allow casting of fishing line 18 in a well-known manner. Preferably, reel frame 12 includes an attachment foot 24 to permit the reel to be mounted to a fishing rod.

Figure 3:
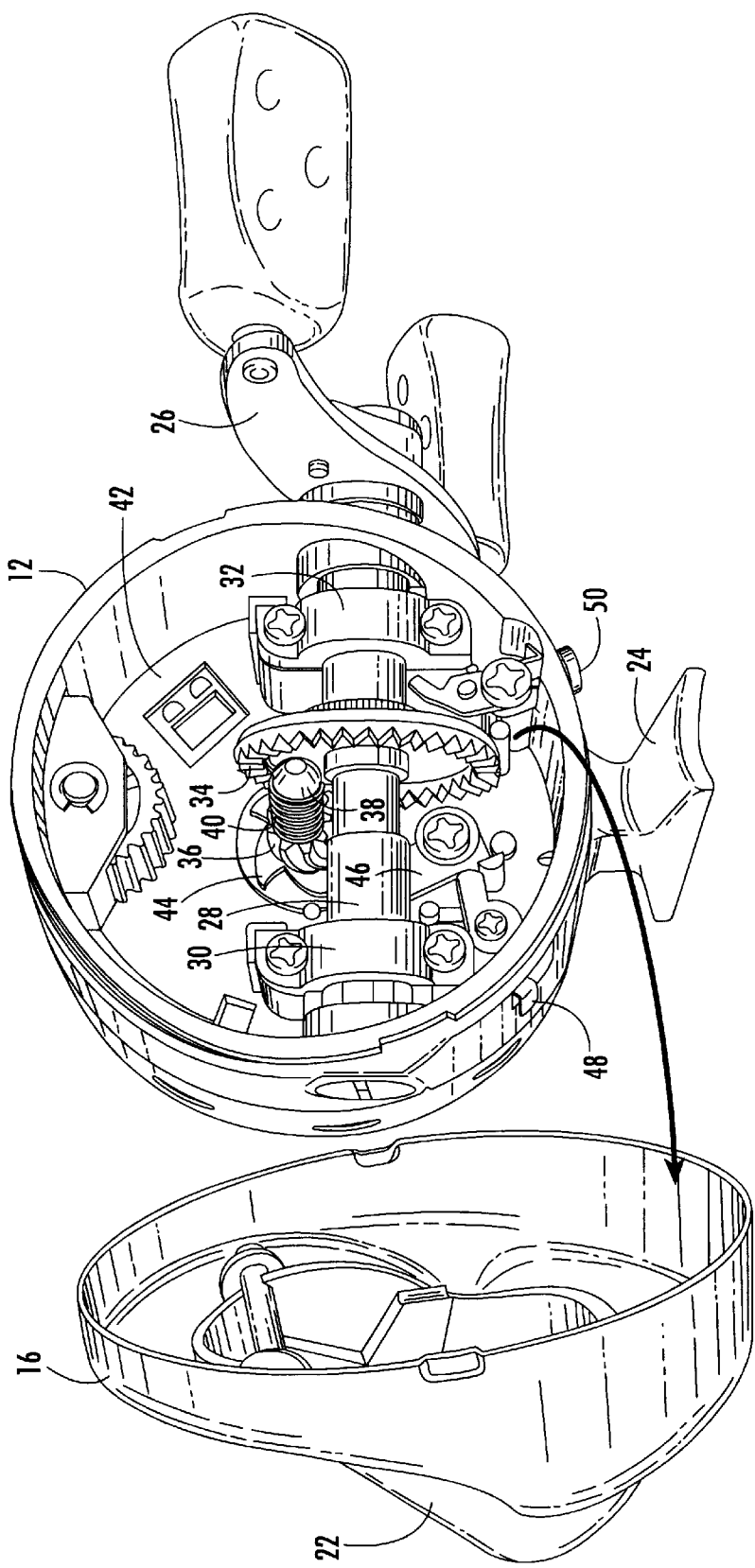
FIG. 3 is a rear view of the reel shown in FIG. 1, with the rear cover detached to reveal various internal components thereof.

A crank handle 26 is rotated by a user when it is desired to wind fishing line 18 back in. As shown in FIG. 3, crank handle 26 is attached to the end of a transverse shaft 28 supported for rotation by bushings 30 and 32. A bevel gear 34, carried by shaft 28, engages a pinion 36. Rotation of pinion 36 causes simultaneous rotation of a main shaft 38 extending therethrough.

Main shaft 38 is axially movable with respect to pinion 36, but is normally urged in an axially rearward direction by a helical spring 40. The end of main shaft 38 is pushed forward when thumb button 22 is depressed, thus permitting the fishing line to be cast. Embodiments of the present invention are also contemplated that utilize a casting lever or other alternative actuator instead of a pivotal thumb button.

Pinion 36 is supported for rotation by a circular frame wall 42, which generally divides the enclosure of reel 10 into front and rear compartments. A ratchet wheel 44 is located at the base of pinion 36 for engaging a pawl member 46. Wheel 44 and pawl member 46 form an anti-reverse ratchet mechanism which prevents undesired rotation of main shaft 38 in the counterclockwise direction. The anti-reverse mechanism, however, may be selectively disengaged via lever 48. The illustrated embodiment further includes a bait click mechanism 50 which may also be engaged or disengaged at the option of the user.

Figure 4:
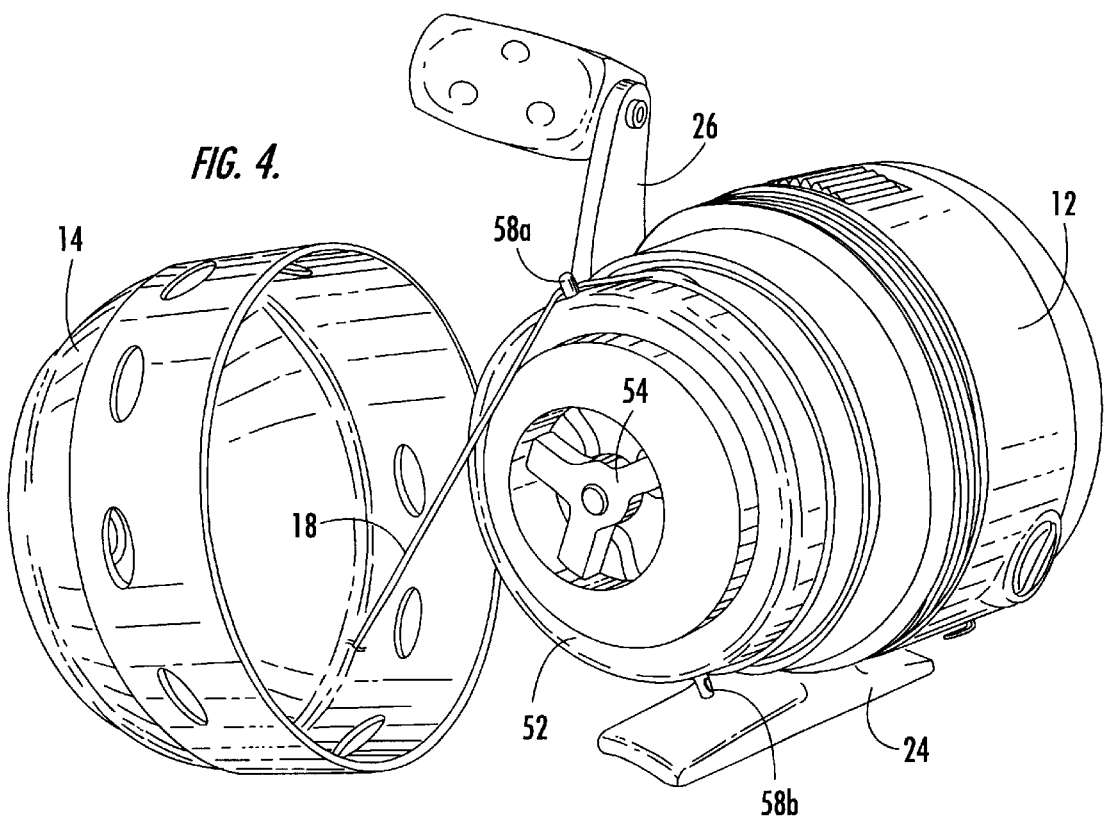
FIG. 4 is a front perspective view of the reel shown in FIG. 1, with the front cover detached to reveal the line pickup head.

Front cover 14 is detached in FIG. 4 to illustrate various components located within the front compartment of reel 10. As shown, a pickup head 52 includes a suitable retaining element 54 located at the end of main shaft 38. As a result, rotation of crank handle 26 causes a concomitant rotation of pickup head 52. Pickup head 52 engages fishing line 18 so as to wind it onto a normally nonrotatable line spool 56 (FIG. 5).

In this case, pickup head 52 is constructed having a pair of diametrically opposed pickup pins 58a–b. As one skilled in the art will appreciate, pickup pins 58a–b are retracted into pickup head 52 during casting of fishing line 18. When fishing line 18 is being retrieved, however, pickup pins 58a–b are extended (as shown) to engage the line.

Figure 5:
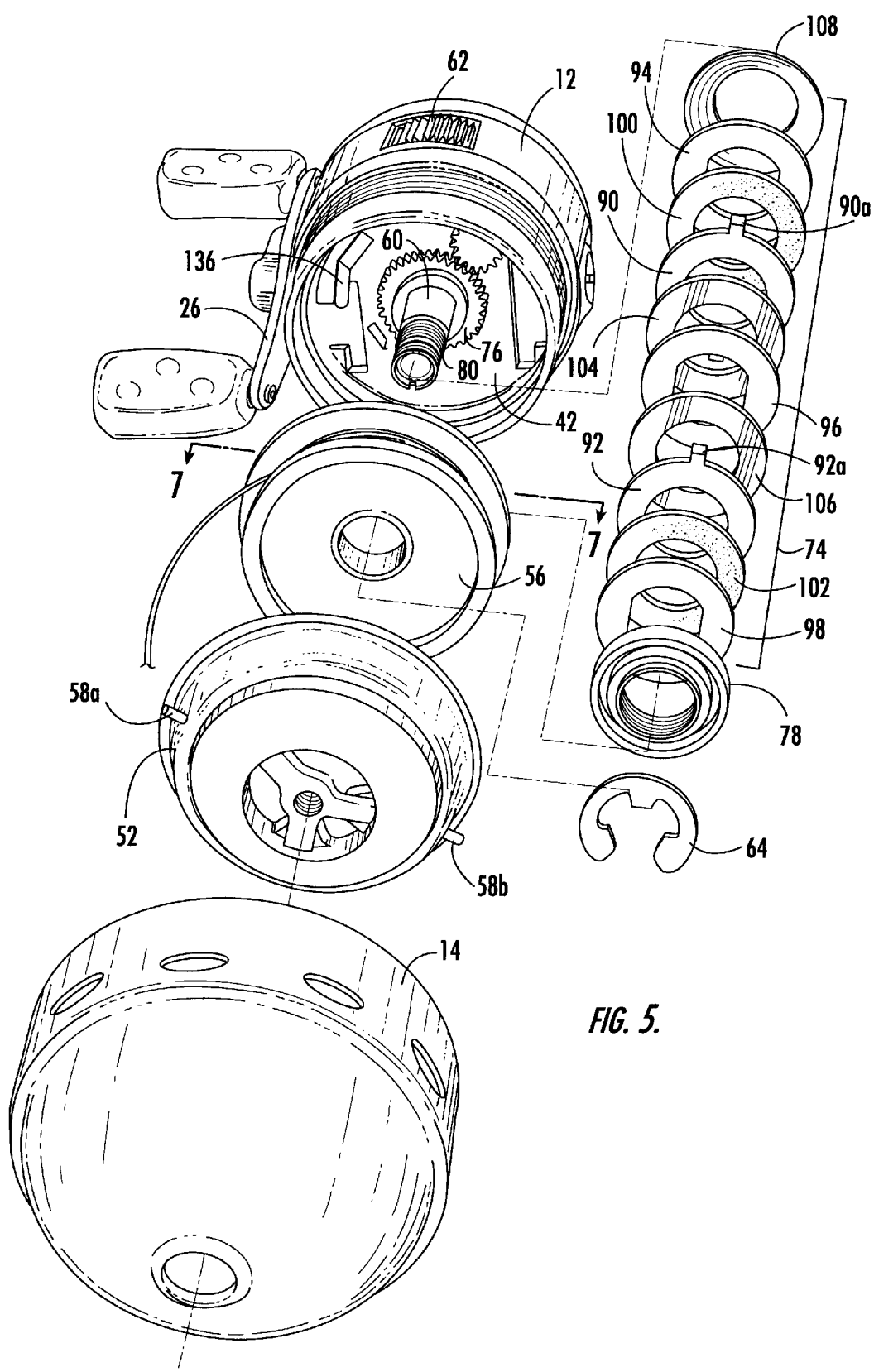
FIG. 5 is a partially exploded view of components in the front internal compartment of the reel shown in FIG. 1.
Figure 6:
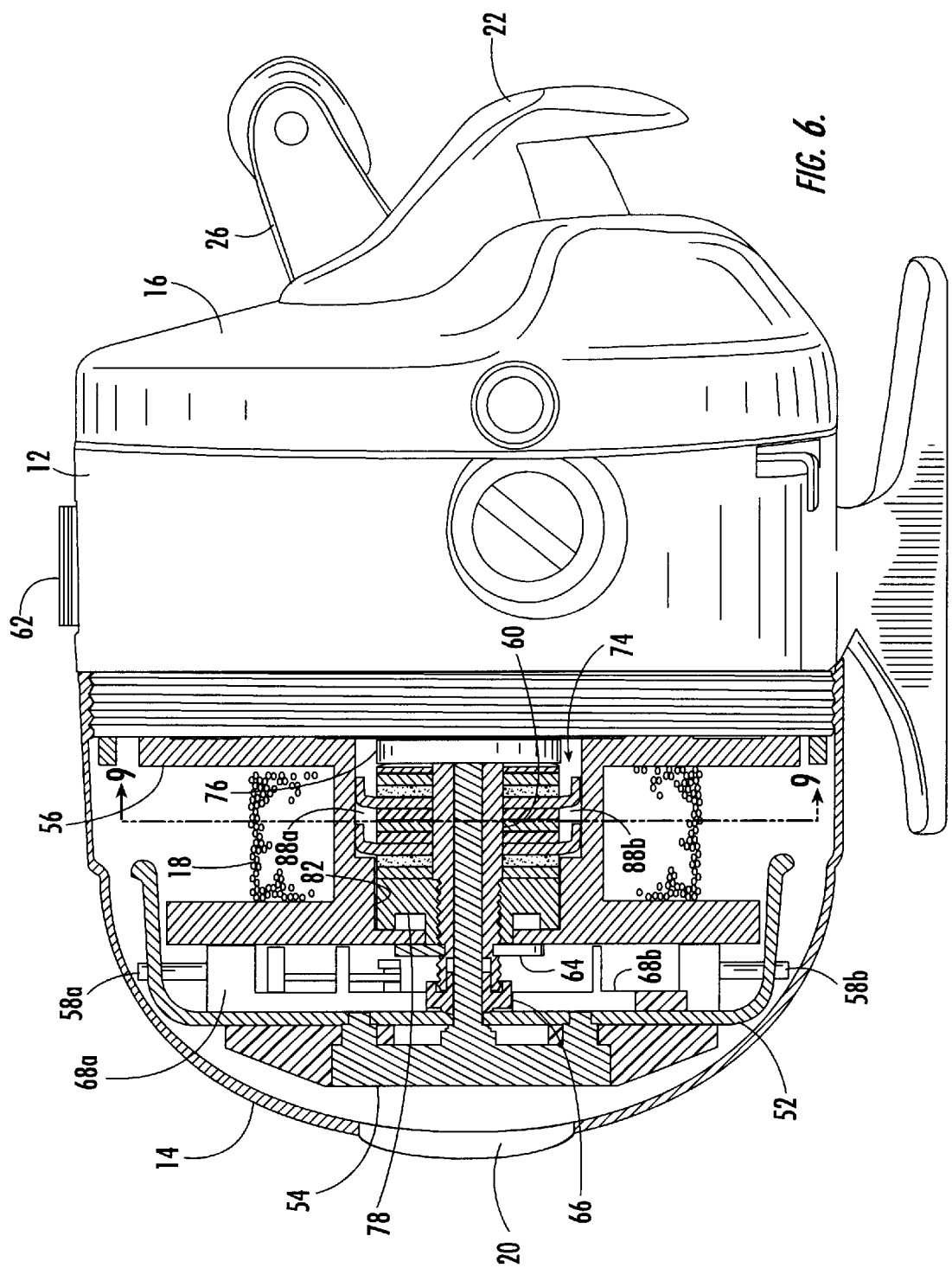
FIG. 6 is a partial cross-sectional view of components located in the front internal compartment of the reel shown in FIG. 1.
Figure 8:
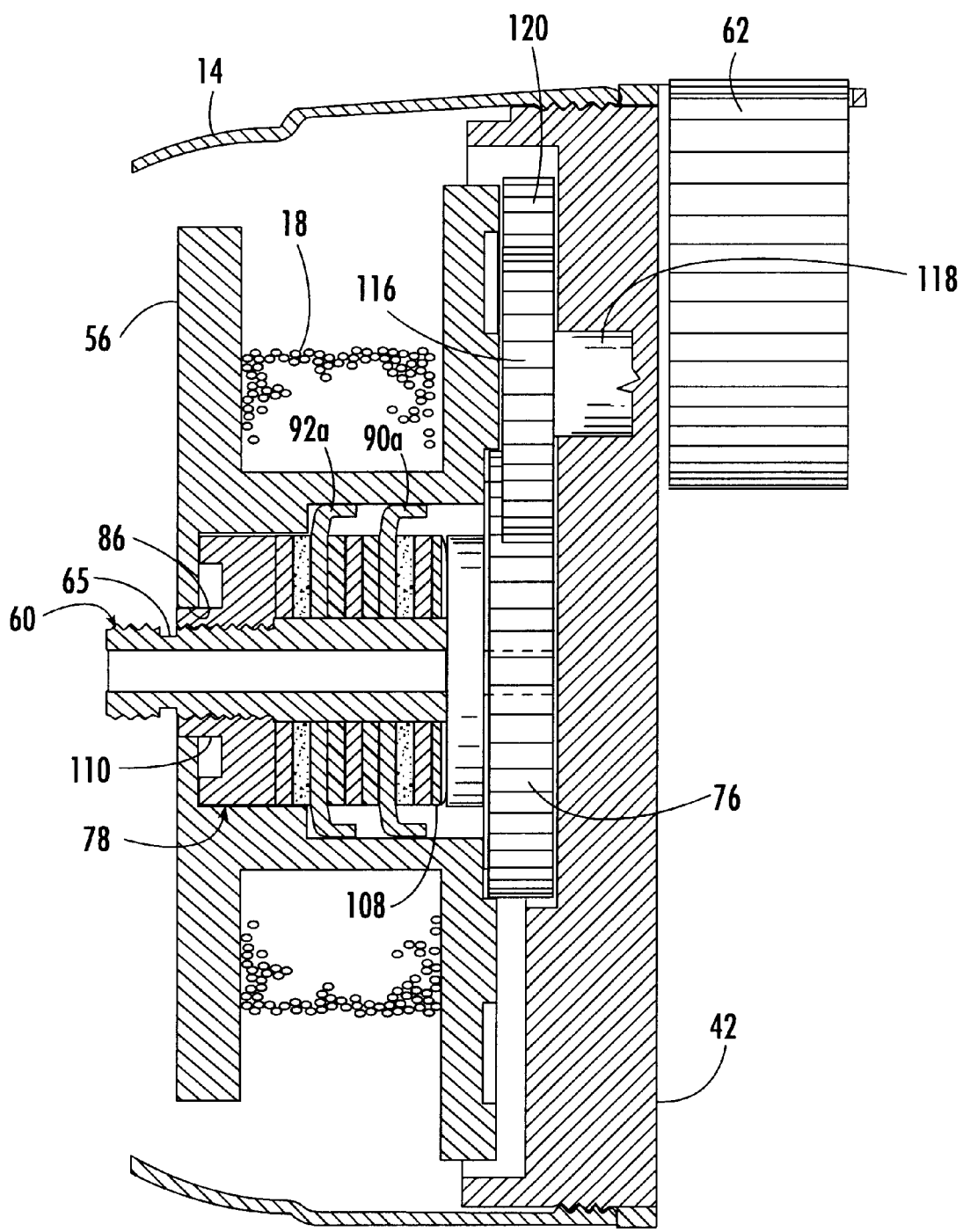
FIG. 8 is an enlarged cross-sectional view of the preferred drag assembly.
Figure 9:
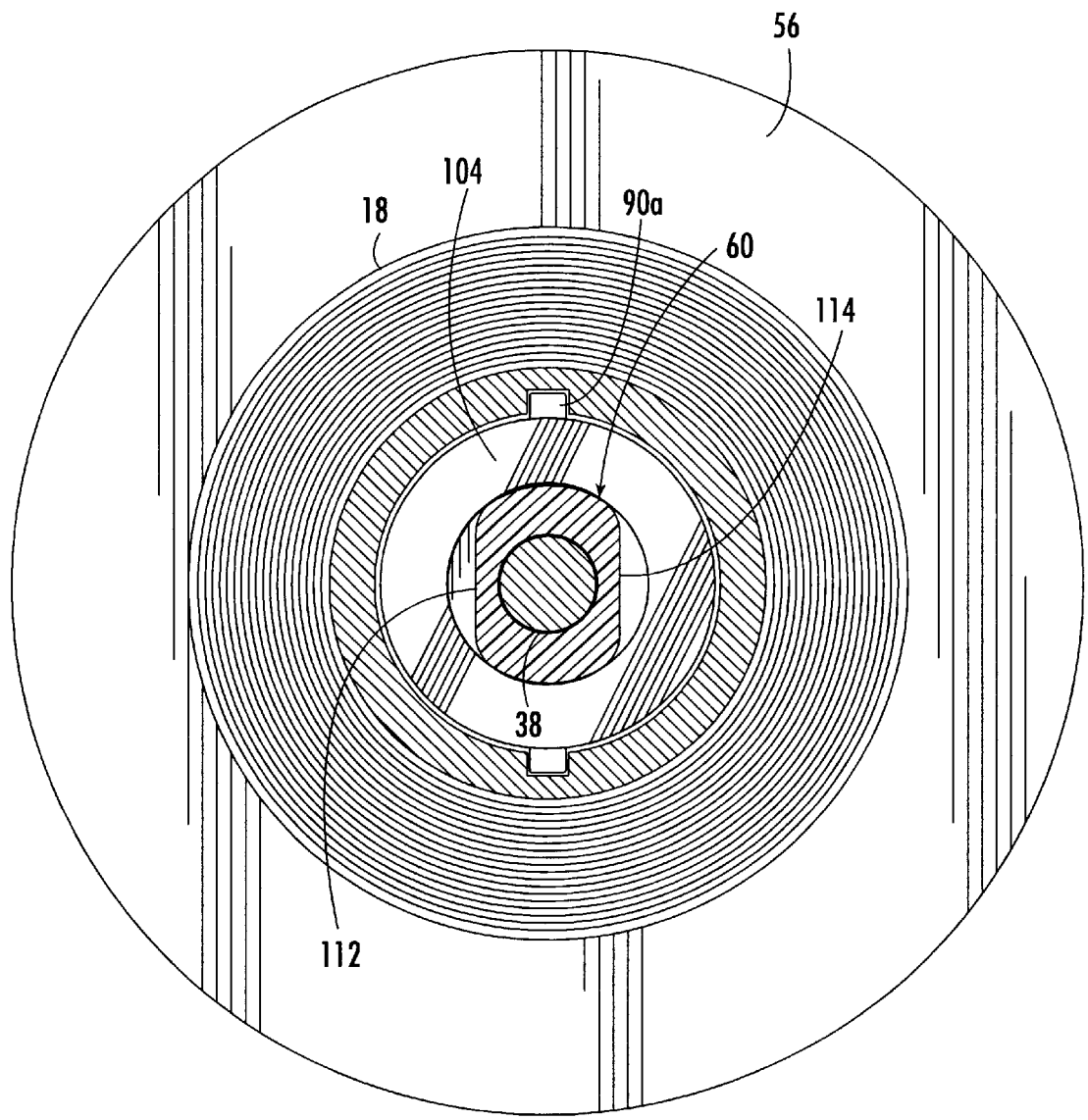
FIG. 9 is a cross-sectional view taken along line 9—9 of FIG. 6.

Referring now to FIGS. 5 and 6, line spool 56 is mounted on a cylindrical hub 60 extending from frame wall 42. Line spool 56 is normally nonrotatable when mounted on hub 60, but may undergo limited rotary slippage under line tension. The force required to produce such slippage is controlled by the reel's drag mechanism. The drag force may be adjusted by a thumb wheel 62 projecting through a slot in the outer surface of reel frame 12. Line spool 56 is retained in position by a retaining clip 64 or other suitable means. Clip 64 is received in a corresponding slot 65 defined in hub 60 (FIG. 8).

As can be seen in FIG. 6, a cam insert 66 is located at the end of spool hub 60. Insert 66 defines an outer cylindrical surface which forces pickup pins 58a–b into their extended positions. In particular, pickup pins 58a–b are attached to respective followers 68a–b. Followers 68a–b ride upon the outer surface of cam insert 66 when line 18 is being retrieved.

During casting, pickup head 52 is moved axially forward such that followers 68a–b are located ahead of cam insert 66. Springs urge followers 68a–b inward, thus retracting pickup pins 58a–b. As a result, pickup pins 58a–b are pulled through slots in the outer surface of pickup head 52.

After casting, the user rotates crank handle 26, which causes pickup head 52 to also rotate. In this case, a relatively shallow cam surface is located on the front of insert 66 to facilitate the outward movement of followers 68a–b. When followers 68a–b are moved outward in this manner, the force of spring 40 causes main shaft 38 to move in a rearward axial direction. Pickup head 52 is then positioned to wind the fishing line onto spool 56.

Referring particularly to FIGS. 5 and 6, reel 10 includes a novel drag mechanism that advantageously provides uniform drag characteristics in an axially compact package. The drag mechanism includes a variable drag assembly which is interconnected to line spool 56 so as to allow adjustment of the drag force imposed thereon. In the illustrated embodiment, the variable drag assembly includes a plurality of discs (collectively indicated at 74) located on spool hub 60 in a stacked arrangement. The discs are sandwiched between a drag nut 76 located at the base of spool hub 60 and a suitable retaining element axially spaced therefrom. In this case, the retaining element is a retaining nut 78 located on a threaded portion 80 of spool hub 60.

The stacked discs 74 and retaining nut 78 are received in a relatively large central cavity 82 defined in line spool 56. In this embodiment, a gear seat 84 having a greater inner diameter is located at the open end of cavity 82. As one skilled in the art will appreciate, gear seat 84 provides clearance for a portion of the drag nut 76 as it axially moves. A hole 86 having a lesser inner diameter is located at the closed end of cavity 82 for passage of spool hub 60. A pair of keyways 88a–b are opposed to one another across central cavity 82.

Referring again to FIG. 5, it can be seen that a variety of different types of discs may be provided in order to achieve the desired function. For example, discs 90 and 92 include diametrically extending tabs (such as tabs 90a and 92a) for receipt in;keyways 88a–b of line spool 56. Several nonrotatable discs 94, 96 and 98 are also preferably provided. In addition, various washers are preferably located between the rotatable and nonrotatable discs. For example, the illustrated embodiments include first drag washers (indicated at 100 and 102) and second drag washers (indicated at 104 and 106). These washers may be formed of suitable material, such as oil impregnated felt, TEFLON®, RULON®, asbestos,; leather, phenolic, or combinations of washers of different materials.

At least one of the discs will preferably be configured as a spring disc. In the illustrated embodiment, for example, a spring disc 108 is located at the base of the disc stack adjacent to drag nut 76. Spring disc 108 may be a bellville spring as shown, or may take any other suitable form (such as a wave spring). In addition to providing a comfortable resistance to tightening the thumb wheel, spring disc 108 helps to maintain the position of the drag while the reel is being used.

Certain additional details may now be most easily explained with reference to FIGS. 8–11. As shown in FIG. 8, for example, retaining nut 78 includes a neck portion 110 extending through hole 86 of line spool 56. Neck portion 110 thus serves to center line spool in position on spool hub 60. In addition, spool hub 60 defines lateral flats 112 and 114 (FIG. 9) complementary to the inner bore of the nonrotatable discs.

Figure 10:
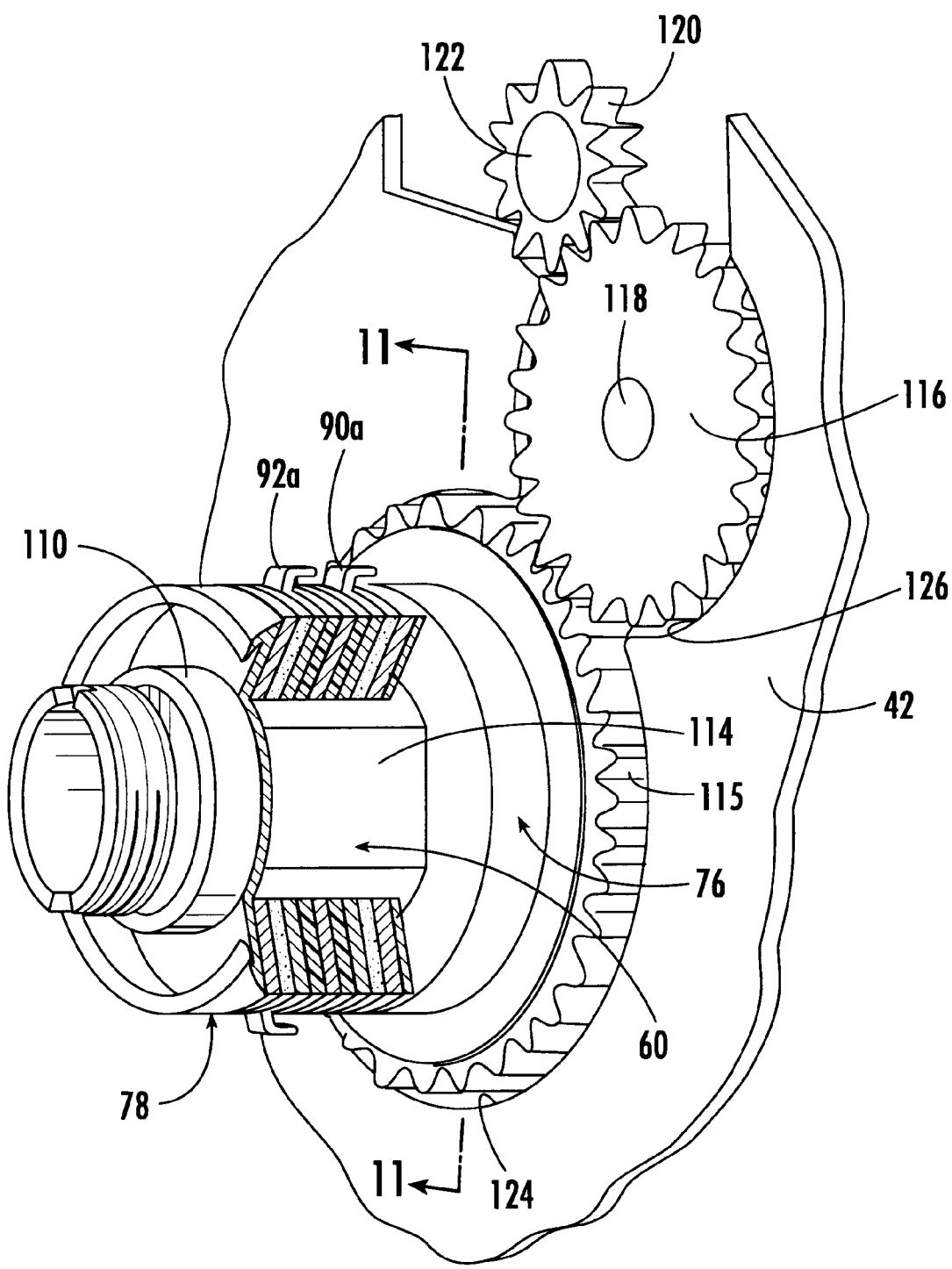
FIG. 10 is an enlarged perspective view of a preferred drag assembly.

Referring now particularly to FIG. 10, a suitable gear train arrangement is provided to operatively connect thumb wheel 62 with drag nut 76. In this case, for example, gear teeth 115 located on the outer periphery of drag nut 76 are engaged by an idler gear 116. Idler gear 116 is supported for free rotation by a shaft 118 extending through frame wall 42. Gear 116 is,* in turn, engaged by a pinion gear 120 located at one end of a shaft 122 that also extends through wall 42. Because the opposite end of shaft 122 carries thumb wheel 62, rotation of thumb wheel 62 by a user will cause a resulting rotation of drag nut 76.

Frame wall 42 preferably defines a second gear seat 124 into which drag nut 76 is partially received. Idler gear 116 may be similarly received in a corresponding gear seat 126. This tends to further reduce the overall axial displacement of the drag mechanism.

Figure 11:
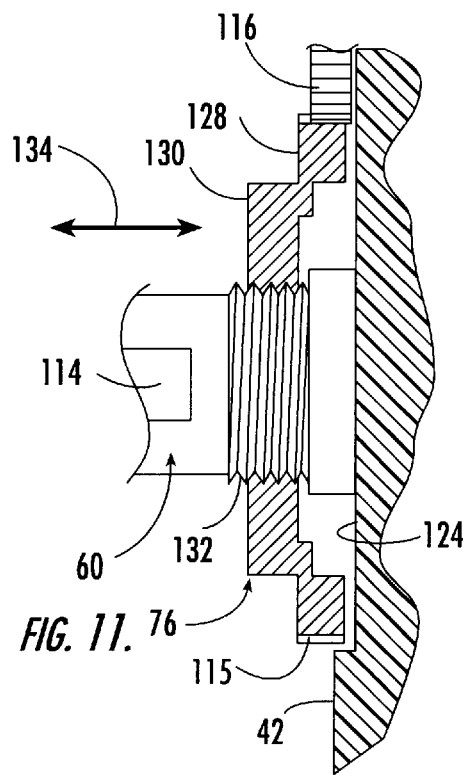
FIG. 11 is a partial cross-sectional view taken along line 11—11 of FIG. 10.

Referring now to FIG. 11, drag nut 76 includes a first axial portion 128 of greater outer diameter and a second axial portion 130 of lesser outer diameter. As shown, gear teeth 115 are located about first axial portion 128. Second axial portion 130 defines inner threads that engage outer threads 132 defined on a second threaded portion located at the base of spool hub 60. Thus, as drag nut 76 rotates, it will be moved through a limited axial range on spool hub 60 (as indicated by arrow 134).

It will be appreciated that the direction of axial movement of drag nut 76 will depend upon the direction of rotation. As the drag force is increased, second axial portion 130 will move farther into cavity 82. First axial portion 128 will move away from gear seat 124 and farther into gear seat 84. As a result, -the stack of discs will be compressed, causing a frictional resistance between the rotatable and nonrotatable discs. In other words, the amount of torque required to rotate tabbed discs 90 and 92 will increase. Rotation of drag nut 76 in the other direction (by corresponding rotation of thumb wheel 62) reduces the torque required to rotate tabbed discs 90 and 92.

In contrast with prior art arrangements, drag nut 76 applies the drag force evenly around spool 56, rather than at one point. In addition, there is a slight mechanical advantage created by the gears that is not present in many prior art arrangements. One preferred embodiment of reel 10 uses a gear ratio of 3.8 to 1, although a variety of different gear ratios could be utilized in accordance with the present invention.

Figure 7:
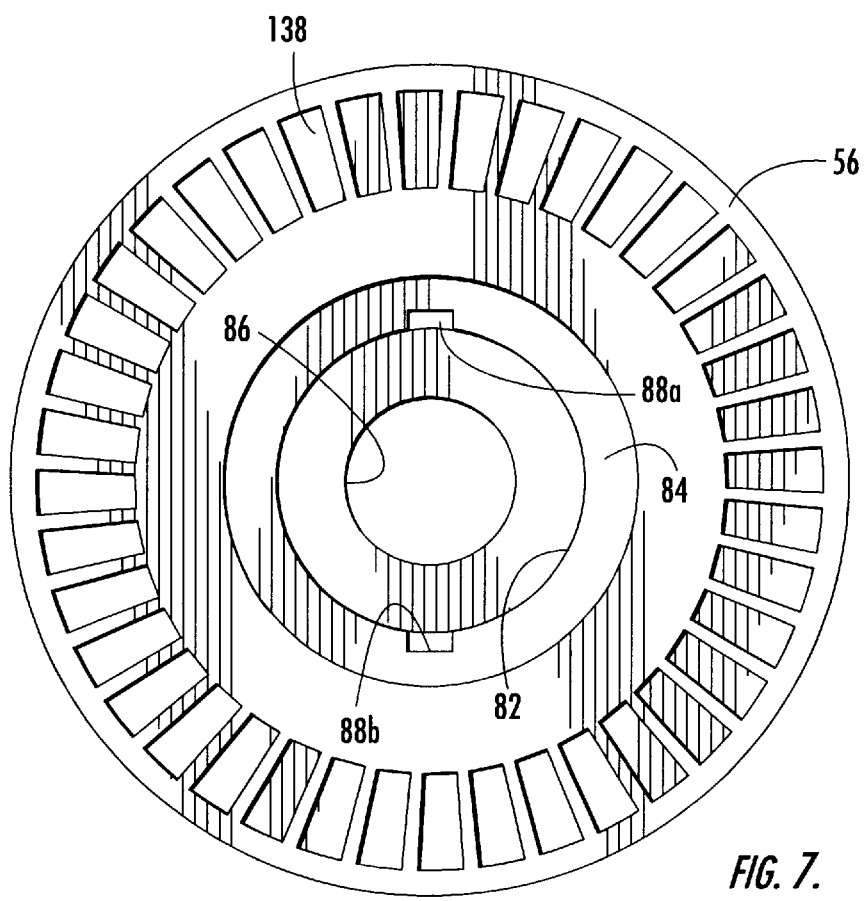
FIG. 7 is an elevational view of the line spool taken along line 7—7 of FIG. 5.

Referring again to FIG. 5, a click feature may also be integrated,into the system so that there is an audible indication when line spool 56 is being rotated against the drag force. In this case, the audible indication is provided by a tab 136 mounted to frame wall 42. Tab 136, which may be made from a suitable plastic or metal, contacts an engaging surface 138 defined on the back side of spool 56 (FIG. 7). As spool 56 rotates, tab 136 flexes to produce the desired clicking noise.

Figure 12:
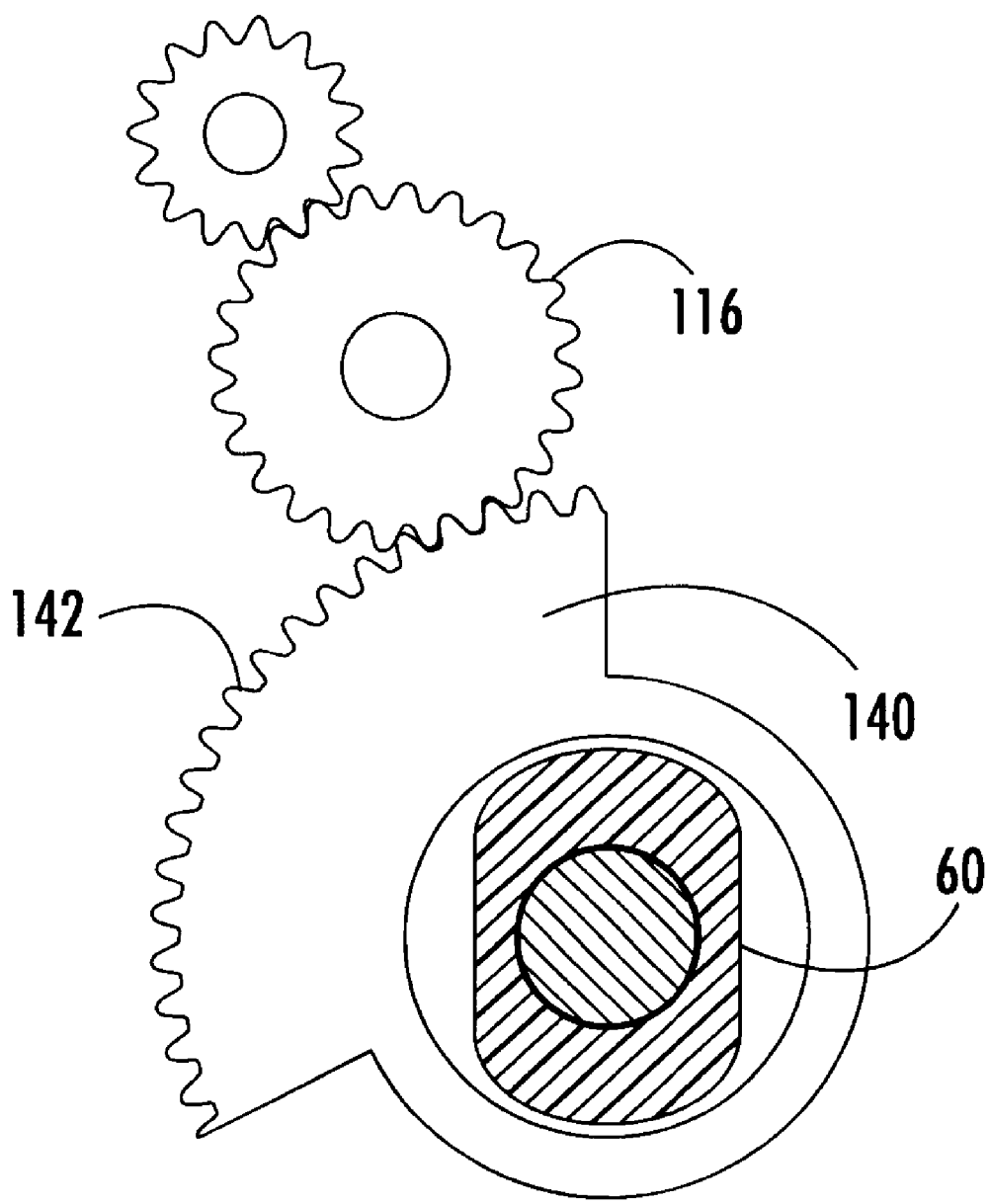
FIG. 12 illustrates an alternative drag nut that may be utilized in some embodiments of the present invention.

FIG. 12 illustrates an alternative embodiment that may be desirable in some cases. Here, a drag nut 140 has gear teeth 142 engaging idler gear 116 in a similar manner to the embodiment described above. In this case, however, gear teeth 142 are located only on a limited angular segment of drag nut 140 (instead of extending about the entire outer periphery as in drag nut 76).

While preferred embodiments of the invention have been shown and described, modifications and variations may be made thereto by those of ordinary skill in the art without departing from the spirit and scope of the present invention. For example, various types of levers or other manual actuators may be used in lieu of a thumb wheel to vary the drag force. It may also be possible to use a toothed belt or the like to cause rotation of the drag nut instead of gear train arrangements discussed above. It should also be understood that aspects of the various embodiments may be interchanged both in whole or in part. Furthermore, those of ordinary skill in the art will appreciate that the foregoing description is by way of example only, and is not intended to be limitative of the invention as further described in the appended claims.

What is claimed is:

1. A fishing reel comprising:
   a reel frame including a fixed spool support hub extending therefrom, said spool support hub having a threaded portion located near a base thereof;
   a drag nut located on said threaded portion of said spool support hub;
   a normally nonrotatable line spool mounted on said spool support hub, said line spool defining a central cavity that opens toward said frame wall;
   a drag assembly received in said central cavity of said line spool, said drag assembly connected to said line spool so as to impose a drag force thereon; and said drag nut operatively engaging said drag assembly such that axial movement of said drag nut due to angular turning thereof will vary the drag force imposed on said line spool.

2. A fishing reel as set forth in claim 1, wherein said central cavity defines at least one axial keyway engaged by at least one tab of said drag assembly.

3. A fishing reel as set forth in claim 2, wherein said central cavity defines first and second diametrically opposite keyways engaged by respective keys of said drag assembly.

4. A fishing reel as set forth in claim 2, wherein said drag assembly includes a plurality of discs in a stacked arrangement, said discs being arranged to increase said drag force upon compression thereof by said drag nut.

5. A fishing reel as set forth in claim 4, wherein a first predetermined number of said plurality of discs are nonrotatable discs and a second predetermined number of said disc are rotatable discs.

6. A fishing reel as set forth in claim 5, wherein at least one of said discs is configured as a spring disc.

7. A fishing reel as set forth in claim 4, wherein said plurality of discs are located on said spool support hub between said drag nut and a retaining element.

8. A fishing reel as set forth in claim 7, wherein said retaining element is located inside said central cavity of said spool support hub.

9. A fishing reel as set forth in claim 1, further comprising a thumb wheel operatively connected to said drag nut such that rotation of said thumb wheel effects axial movement of said drag nut.

10. A fishing reel as set forth in claim 9, wherein said thumb wheel has a generally cylindrical configuration.

11. A fishing reel comprising:
a reel frame including a spool support hub, said spool support hub having a threaded portion;
a drag nut located on said threaded portion of said spool support hub;
a normally nonrotatable line spool mounted on said spool support hub, said line spool defining a central cavity;
a drag assembly received in said central cavity of said line spool, said drag assembly connected to said line spool so as to impose a drag force thereon;
said drag nut operatively engaging said drag assembly such that axial movement of said drag nut due to antgular turning thereof will vary the drag force imposed on said line spool;
said drag nut including a first portion of greater outer diameter having gear teeth on at least an angular segment thereof, said drag nut further including a second portion of lesser outer diameter received in said central cavity of said line spool;
said central cavity defining at least one axial kemway engaged by at least one tab of said drag assembly; and
said drag assembly including a plurality of discs in a stacked arrangement, said discs being arranged to increase said drag force upon compression thereof by said drag nut.

12. A fishing reel as set forth in claim 11, wherein said line spool further defines a first gear seat located about one end of said central cavity, said first gear seat providing clearance for said first portion of said drag nut as said drag nut axially moves.

13. A fishing reel as set forth in claim 12, wherein said gear teeth are located about the entire periphery of said first portion of said drag nut.

14. A fishing reel comprising:
a reel frame including a spool support hub, said spool support hub having a threaded portion;
drag nut located on said threaded portion of said spool support hub;
a normally nonrotatable line spool mounted on said spool support hub, said line spool defining a central cavity;
a drag assembly received in said central cavity of said line spool, said drag assembly connected to said line spool so as to impose a drag force thereon;
said drag nut operatively engaging said drag assembly such that axial movement of said drag nut due to angular turning thereof will vary the drag force imposed on said line spool;
a thumb wheel operatively connected to said drag nut such that rotation of said thumb wheel effects axial movement of said drag nut; and
said thumb wheel having a generally cylindrical configuration and a portion of said thumb wheel extending through a slot defined in said reel frame.

15. A fishing reel comprising:
a reel frame including a spool support hub, said spool support hub having a threaded portion;
a drag nut located on said threaded portion of said spool support hub;
a normally nonrotatable line spool mounted on said spool support hub, said line spool defining a central cavity;
a drag assembly received in said central cavity of said line spool, said drag assembly connected to said line spool so as to impose a drag force thereon;
said drag nut operatively engaging said drag assembly such that axial movement of said drag nut due to angular turning thereof will vary the drag force imposed on said line spool;
a closed-face cover connected to said reel frame to enclose said line spool, said cover including a forward opening therein through which fishing line extends; and
said reel frame including an attachment foot for attaching said reel to a fishing rod.

16. A fishing reel comprising:
a reel frame including a spool support hub;
a normally nonrotatable line spool mounted on said spool support hub, said line spool defining a central cavity;
a pickup head axially and rotatably movable with respect to said line spool;
a drag nut located on said spool support hub, said drag nut defining gear teeth on at least an angular segment of an outer surface thereof;
a drag assembly received in said central cavity of said line spool, said drag assembly connected to said line spool so as to impose a drag force thereon;
a thumb wheel operatively connected to said drag nut such that rotation of said thumb wheel effects axial movement of said drag nut and thereby varies the drag force imposed on said line spool; and
a closed-face cover connected to said reel frame to enclose said line spool and said pickup head, said cover including a forward opening therein through which fishing line extends.

17. A fishing reel as set forth in claim 16, wherein said central cavity defines at least one axial keyway engaged by at least one tab of said drag assembly.

18. A fishing reel as set forth in claim 17, wherein said drag assembly includes a plurality of discs in a stacked arrangement, said discs being arranged to increase said drag force upon compression thereof by said drag nut.

19. A fishing reel assembly as set forth in claim 18, wherein at least one of said discs is configured as a spring disc.

20. A fishing reel as set forth in claim 18, wherein said plurality of discs are located on said spool support hub between said drag nut and a retaining nut.

21. A fishing reel as set forth in claim 20, wherein said line spool defines a first gear seat located about one end of said central cavity.

22. A fishing reel as set forth in claim 21, wherein said gear train arrangement includes a first gear shaft having first and second gears located at each end thereof, said second gear engaging said drag nut.

23. A fishing reel as set forth in claim 21, wherein a portion of said thumb wheel extends through a slot defined in said reel frame.

24. A fishing reel as set forth in claim 16, wherein said central cavity defines first and second diametrically opposite keyways engaged by respective keys of said drag assembly.

25. A fishing reel as set forth in claim 24, wherein a first predetermined number of said plurality of discs are nonrotatable discs and a second predetermined number of said disc are rotatatble discs.

26. A fishing reel as set forth in claim 16, wherein said gear teeth are located about the entire periphery of said drag nut.

27. A fishing reel as set forth in claim 16, wherein said thumb wheel is operatively connected to said drag nut via a gear train arrangement.

28. A fishing reel as set forth in claim 27, wherein said thumb wheel has a generally cylindrical configuration and defines gear teeth on an outer surface thereof, said first gear engaging said thumb wheel.

29. A fishing reel as set forth in claim 16, wherein said reel frame includes a generally circular frame wall, said frame wall defining a second gear seat about a base of said spool support hub.

30. A fishing reel as set forth in claim 29, further comprising a manual actuator operative to effect rotation of said drag nut.

31. A fishing reel as set forth in claim 29, wherein said drag assembly includes a plurality of discs in a stacked arrangement, said discs being arranged to increase said drag force upon compression thereof by said drag nut.

32. A fishing reel comprising:

a reel frame including a spool support hub;

a normally nonrotatable line spool mounted on said spool support hub, said line spool defining a central cavity;

a pickup head axially and rotatably movable with respect to said line spool;

a crank handle operatively associated with said pickup head such that rotation of said crank handle causes rotation of said pickup head;

a drag nut located on said spool support hub such that angular turning of said drag nut affecting axial movement thereof;

a drag assembly received in said central cavity of said line spool, said drag assembly connected to said line spool so as to impose a drag force thereon;

said drag nut operatively engaging said drag assembly such that axial movement of said drag nut due to angular turning thereof will vary the drag force imposed on said line spool;

a front cover connected to said reel frame to enclose said line spool and said pickup head, said front cover including a forward opening therein through which fishing line extends; and a rear cover connected to said reel frame, said rear cover having a pivotable thumb button mounted thereon, said thumb button being actuatable to allow casting of said fishing line.

33. A fishing reel as set forth in claim 32, wherein said manual actuator is a thumb wheel having a generally cylindrical configuration, a portion of said thumb wheel extending partially through a slot defined in said reel frame.

34. A fishing reel as set forth in claim 33, wherein a first predetermined number of said plurality of discs are nonrotatable discs and a second predetermined number of said disc are rotatatble discs.

35. A fishing reel assembly as set forth in claim 33, wherein at least one of said discs is configured as a spring disc.

36. A fishing reel as set forth in claim 33, wherein said plurality of discs are located on said spool support hub between said drag nut and a retaining nut.

* * * * *